J. L. SULLIVAN.
Straw Cutter.
No. 17,850.　　　　　　　　　　　　Patented July 21, 1857.
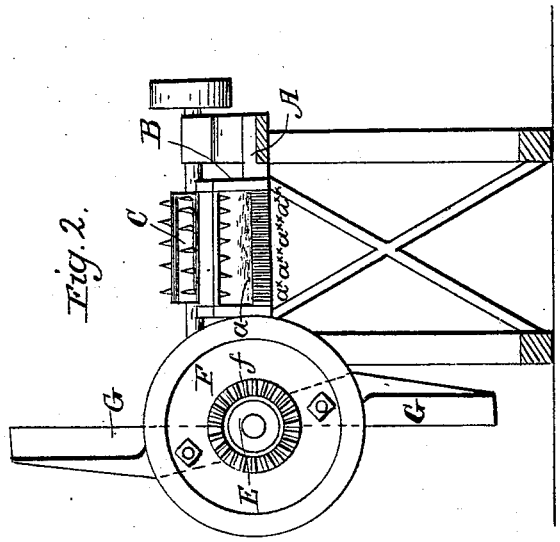
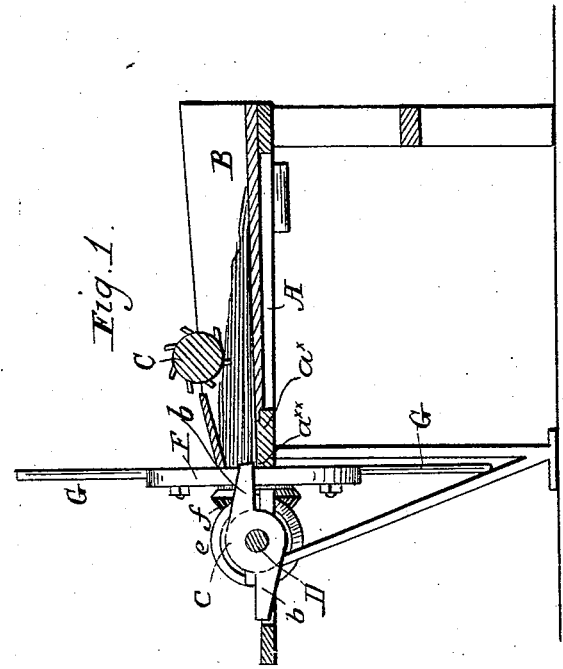
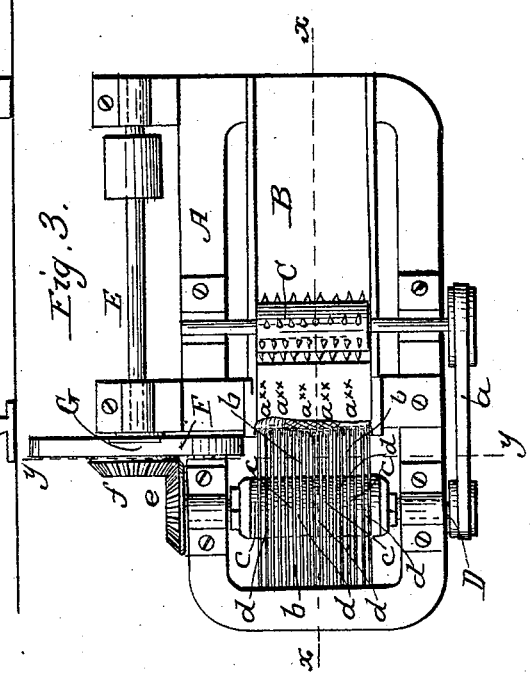

UNITED STATES PATENT OFFICE.

JONATHAN L. SULLIVAN, OF LEXINGTON, NORTH CAROLINA.

STRAW-CUTTER.

Specification of Letters Patent No. 17,850, dated July 21, 1857.

*To all whom it may concern:*

Be it known that I, JONATHAN L. SULLIVAN, of Lexington, in the county of Davidson and State of North Carolina, have invented a new and Improved Straw-Cutter; and I do hereby declare that the following is a full, clear, and exact description of the same, reference being had to the annexed drawings, making a part of this specification, in which—

Figure 1 is a longitudinal vertical section of my improvement, $(x)$ $(x)$, Fig. 3, indicating the plane of section. Fig. 2 is a transverse vertical section of ditto, $(y)$ $(y)$, Fig. 3, indicating the plane of section. Fig. 3 is a plan or top view of ditto.

Similar letters of reference indicate corresponding parts in the several figures.

This invention consists in employing two sets of rotating knives so arranged that their planes of rotation will be at right angles to each other.

The object of this invention is to effect the thorough or perfect cutting of straw or hay when in an entangled mass. The usual straw cutters can cut the hay or staw evenly or of equal lengths only when the straw or hay is fed to the knives or cutters at right angles or nearly so, and consequently straw which is in an entangled state cannot be well or evenly cut. My improved cutter will chop or cut, in an entangled state, either hay or straw equally as well and as evenly as if it were at right angles to the cutters of the usual machines.

To enable those skilled in the art to fully understand and construct my invention, I will proceed to describe it.

A, represents a horizontal frame which is supported at a suitable height in any proper manner.

B, represents a feed box placed on the frame A. A toothed feed roller C, is placed transversely within it. Motion is communicated to the feed roller by a belt $(a)$ from a shaft D, which is placed a certain distance in front of the feed box and parallel with the feed roller C.

The front end of the bottom of the feed box B, is provided with a metal plate $(a^{\times})$ which is slotted longitudinally as shown at $(a^{\times \times})$, to allow the ends of knives $(b)$, to pass through. The knives $(b)$, are placed on the shaft D, and project from it at right angles and from opposite sides as shown clearly in Figs. 1 and 3. The knives are constructed of sheet steel, and they are attached to circular plates, that is, each pair or each two that project from opposite sides of the shaft, see Fig. 1, in which a pair of knives $(b)$, is shown projecting from the plate $(c)$. The knives and circular plates may be cut in a single piece from a plate of steel. The knives are secured upon the shaft D, at equal distances apart by means of washers $(d)$, which are placed between the plates $(c)$. The ends of the knives $(b)$, reach as far as the inner ends of the slots.

To one end of the shaft D, the end opposite to that on which the pulley over which the belt $(a)$ passes there is attached a beveled toothed wheel $(e)$. This wheel $(e)$, gears into a corresponding wheel $(f)$, placed on a shaft E, which is the driving or power shaft.

On the shaft E, and adjoining the beveled wheel $f$, a disk wheel F, is placed. To the wheel F, two knives G, G, are placed. These knives project from the wheel F, at opposite sides and in the same plane, as shown clearly in Figs. 1 and 2. The knives G, are sufficiently long to extend entirely across the front end of the plate $(a)^{\times}$, the knives, as the wheel F, rotates, passing quite close to the front edge of the plate $(a^{\times})$. The relative position of the knives $(b)$, and G, is such that they act alternately upon the straw or hay, the knives $(b)$, being in a horizontal position when the knives G, are in a vertical position and vice versa.

The operation is as follows: The hay or straw, shown in red, is placed within the feed box B, and motion is given the shaft E, in any proper manner. The roller C feeds the hay or straw to the knives, the knives G, cutting the portion of the hay or straw which passes underneath the cutting edges at right angles, and the cutters $(b)$, cutting the portion that passes over the end of the plate $(a^{\times})$ at right angles with them. It will at once be seen that the hay or straw that is at right angles or nearly so with the knives $(b)$, could not be cut in proper lengths by the cutters G, and the portion of the hay or straw which passes underneath the knives G, at right angles cannot be cut in proper lengths by the knives $(b)$; and hence in the straw cutters of usual construction where one set of knives are only used, it is essential that the hay or straw be adjusted before it is placed in the feed box so that it will pass underneath the knives at right angles. If this is not done the hay or straw will be cut very unevenly.

By my improvement the hay or straw may be fed to the knives in an entangled mass. No care or attention is required in adjusting it. It will cut evenly, and consequently much material that cannot now be cut in a proper manner, on account of no machine being devised for the purpose, may be cut equally as well as the other. Hay, straw, etc., often becomes entangled, and a great deal accumulates on farms which is now used merely as refuse, and which by my improvement may be cut and rendered as valuable for fodder as any other.

Having thus described my invention, what I claim as new, and desire to secure by Letters Patent, is:

The two sets of knives G, ($b$), and slotted plate ($a^\times$), combined and arranged so as to operate conjointly as shown, for the purpose set forth.

JONATHAN L. SULLIVAN.

Witnesses:
GEORGE KINNEY,
FELIX CLODFELTER.